R. S. LORD.
CLAMPING DEVICE FOR PIPE JOINTS.
APPLICATION FILED OCT. 22, 1910.
1,019,717.
Patented Mar. 5, 1912.
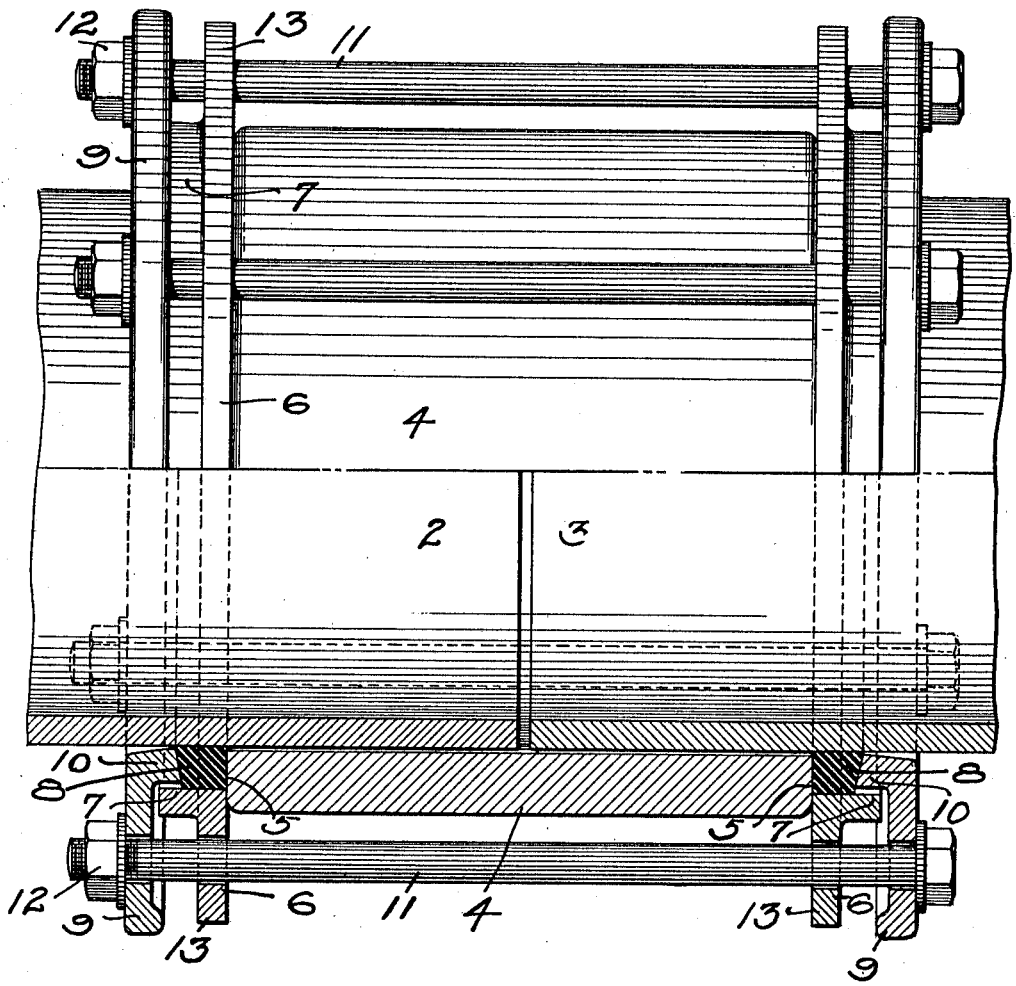
WITNESSES.
INVENTOR.
Raymond S. Lord

UNITED STATES PATENT OFFICE.

RAYMOND S. LORD, OF PITTSBURGH, PENNSYLVANIA.

CLAMPING DEVICE FOR PIPE-JOINTS.

1,019,717. Specification of Letters Patent. Patented Mar. 5, 1912.

Original application filed September 20, 1909, Serial No. 518,641. Divided and this application filed October 22, 1910. Serial No. 588,458.

*To all whom it may concern:*

Be it known that I, RAYMOND S. LORD, a citizen of the United States of America, residing at Pittsburgh, in the county of Allegheny and State of Pennsylvania, have invented a certain new and useful Improvement in Clamping Devices for Pipe-Joints, of which the following is a full, clear, and exact description, reference being had to the accompanying drawings, forming part of this specification.

The object of this invention is to provide a simple, inexpensive, and efficient device for sealing or packing pipe joints against leakage.

The invention will be found particularly adaptable to the sealing of joints employing a coupling ring or sleeve, or similarly formed joints.

I will now describe my invention so that others skilled in the art to which it appertains may understand and construct the same, referring to the accompanying drawings in which—

The figure shown illustrates in sectional elevation my improved clamping device as embodied in joints employing a coupling ring or sleeve.

In the drawing, the reference numerals 2 and 3 indicate the meeting ends of two pipe sections to be joined by the surrounding coupling ring member or sleeve 4. In abutment with the end faces 5 of the sleeve 4 are the ring members 6. Each ring member is provided with an inner annular face or wall 7 between which and the outer wall of the pipe member is adapted to be received the packing ring or gasket 8 which may be of any suitable material and which abuts against the end face 5 contiguous to the space between the pipe wall and end of the sleeve, as is clearly shown.

The numerals 9 indicate the follower or clamping rings, each of which has the annular projecting flange 10 which is adapted to abut against the packing ring 8 and by means of which, when the followers 9 are caused to be moved toward one another, the packing rings will be caused to be compressed.

Means for drawing together or forcing home the follower rings 9 for a seating of the gaskets or packing rings 8, comprise the bolts 11 which extend from one follower ring to the other longitudinally across the coupling sleeve 4 and are provided with the suitable tightening nuts 12. The ring members 6 may be held against displacement or creeping by having the follower rings 9 brought into close proximity thereto or abutment therewith when the latter rings are forced home or drawn toward each other. The clamping bolts 11 may also, as shown, pass through the rings 6, the rings 6 having the radial flange 13 for such engagement with the bolts.

As stated above, as the follower rings are brought together, the packing rings will be caused to be compressed between the walls 7 and the outer faces of the pipe members and the end faces of the coupling sleeve 4. By means of the packing retaining ring, spreading of the packing ring, when forced home, laterally or on radial lines, is prevented, insuring effectual sealing of the joint at the contiguous points of the pipe wall and end of coupling sleeve.

The device is simple in construction, being such that the gasket retaining ring member and follower ring member may be readily cast, formed from sheet metal, or made from rolled shapes. A packing ring of any suitable material may be employed. It will, of course, be apparent, that many changes may be made in the construction set forth which would not depart from my invention. I do not, therefore, desire to limit myself thereto.

I do not claim herein the feature of securing the packing retaining ring to the bell of a bell and spigot pipe joint by means of bolting thereto or screw-tapping thereinto, the same being claimed in a separate application for Letters Patent of the United States, filed by me September 20th, 1909, Serial No. 518,641 and of which this application is a division.

The advantages of my invention will be readily appreciated by those skilled in the art. The device is simple, strong, and inexpensive and is effectual in operation.

Having thus described my invention, what I claim and desire to secure by Letters Patent is—

1. In a device of the character described, the combination with the pipe sections and sleeve portion receiving the meeting ends of the pipe sections, of a ring member in abutment with an end of the sleeve portion and provided with an annular flange disposed ppositely to the pipe wall, a packing ring interposed between the flange and pipe wall, and means for forcing the packing ring home between the flange and pipe wall.

2. In a device of the character described, the combination with the pipe sections and sleeve portion receiving the meeting ends f the pipe sections, of a ring member surrounding a pipe section and in abutment with an end of the sleeve portion and comprising a radial flanged portion and a flange portion lying parallel to the pipe wall, a packing ring interposed between the latter flange and the pipe wall, and means for forcing the packing ring home between the flange and pipe wall.

3. In a device of the character described, the combination with the pipe sections and sleeve portion receiving the meeting ends of the pipe sections, of ring members in abutment with the ends of the sleeve portion, packing rings interposed between the ring members and pipe walls, second ring members abutting against the packing rings, and clamping means for moving the latter ring members toward each other, the clamping means extending from one ring member to the other end engaging with the first named ring members.

In testimony whereof, I have hereunto set my hand.

RAYMOND S. LORD.

Witnesses:
MARY A. BARTH,
M. A. KELLER.

---

Copies of this patent may be obtained for five cents each, by addressing the "Commissioner of Patents, Washington, D. C."